Figure 1:
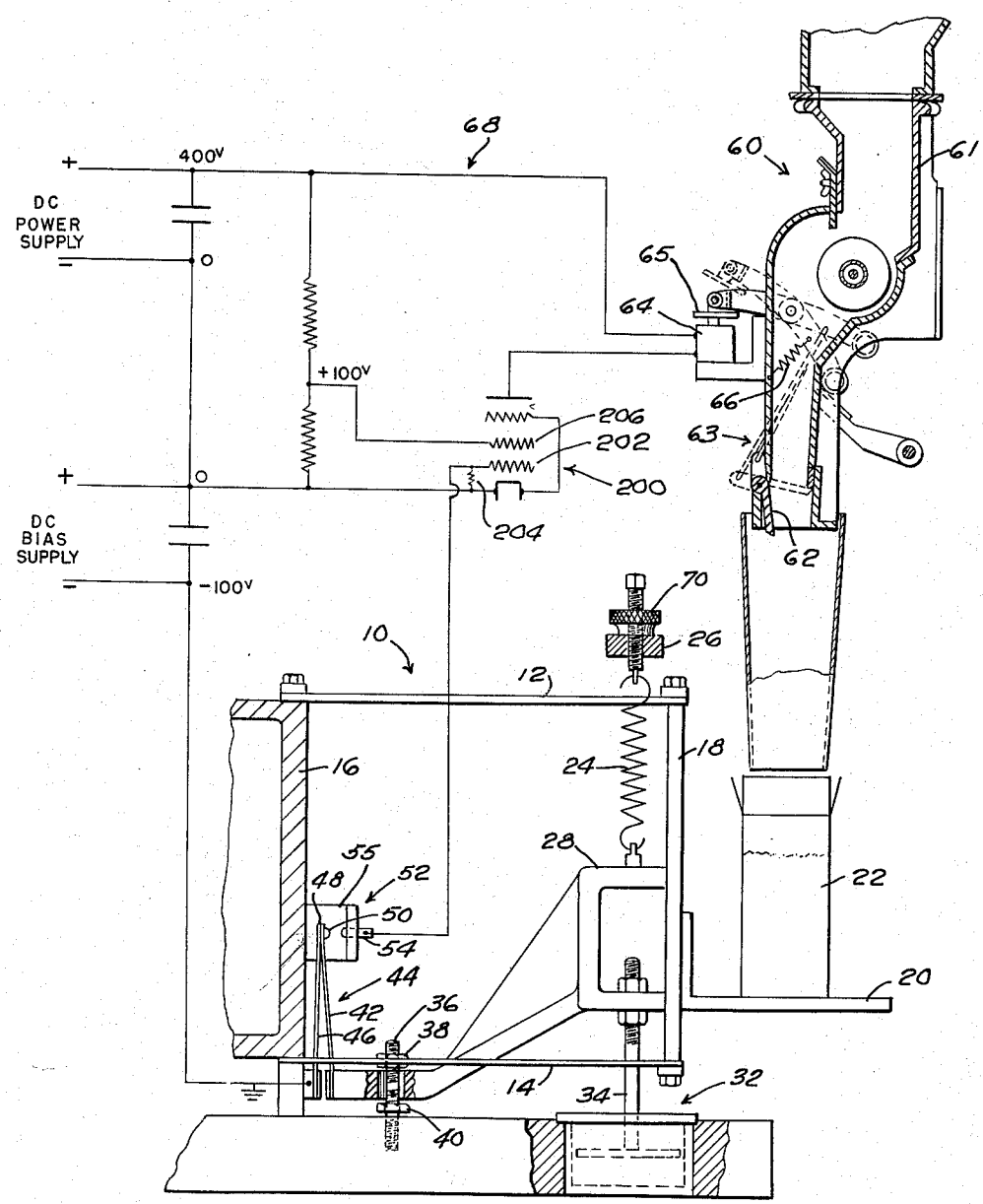

INVENTOR.
Max Knobel
BY Robert R. Churchill
ATTORNEY

United States Patent Office 3,113,632
Patented Dec. 10, 1963

3,113,632
WEIGHING ELEMENT EMBODYING A RESILIENT CONTACT UNIT
Max Knobel, Boston, Mass., assignor to Pneumatic Scale Corporation, Limited, Quincy, Mass., a corporation of Massachusetts
Filed Dec. 31, 1956, Ser. No. 631,801
6 Claims. (Cl. 177—79)

This invention relates to a weighing machine.

The invention has for a principal object to provide novel weighing mechanism for embodiment in weighing machines of various types wherein novel electrical control means is provided for enabling minute movements of the weighing element to control the material feeding mechanism for forming successive loads of predetermined volume and weight.

A further object of the invention is to provide novel and improved weighing mechanism of the character specified which includes novel control mechanism having provision for amplifying minute movements of the weighing element to enable such movements to operatively control the material feeding mechanism in response thereto.

A still further object of the invention is to provide a novel and improved weighing machine of the character specified embodying novel and improved control means responsive to minute movements of the weighing element for controlling bulk material feeding mechanism and drip material feeding mechanism for forming successive weighed loads.

With these general objects in view and such others as may hereinafter appear the invention consists in the weighing machine and in the structures, arrangements and combinations of the parts thereof hereinafter described and particularly defined in the claims at the end of this specification.

Figure 2:
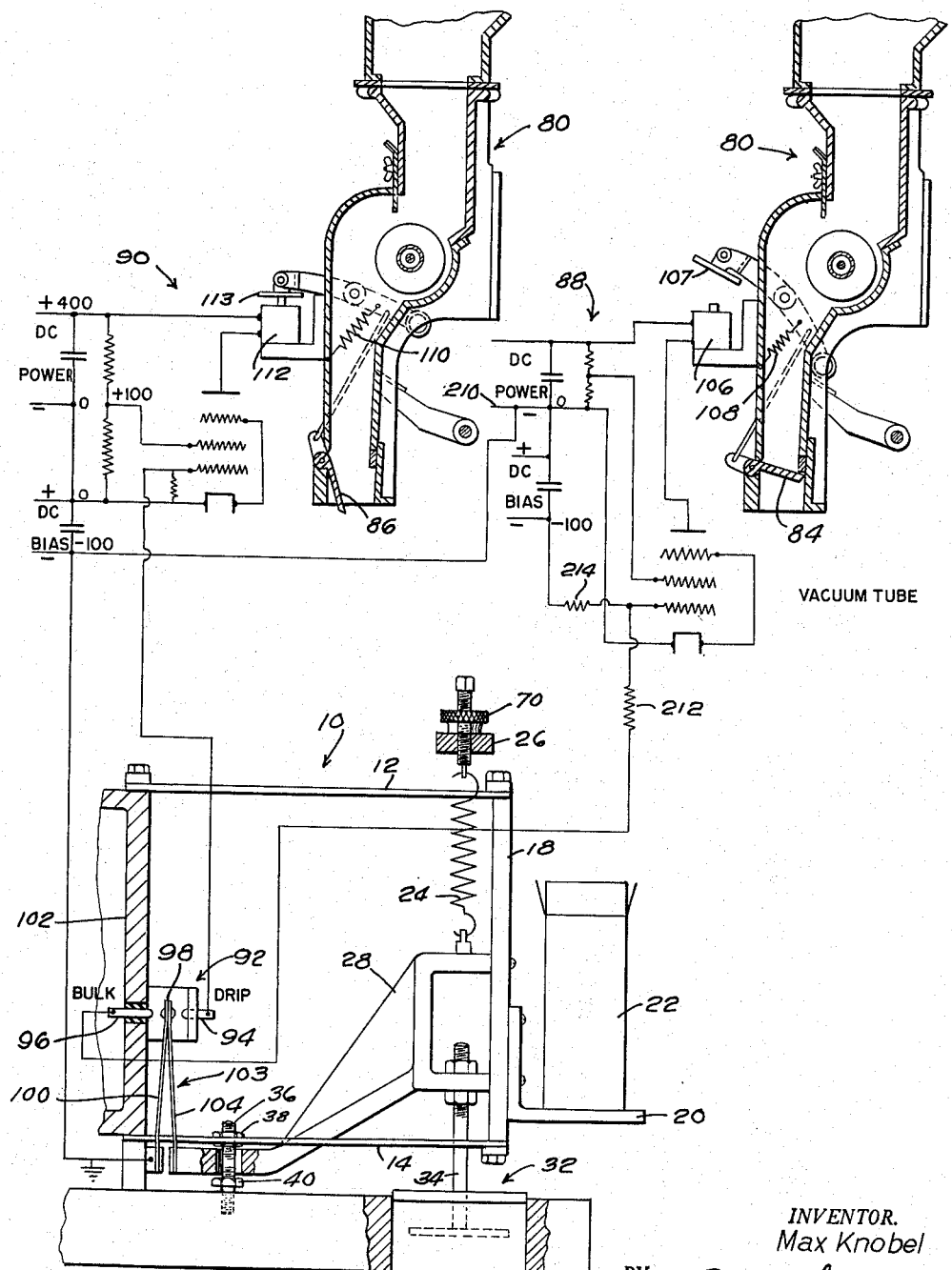

In the drawings illustrating the preferred embodiment of the present invention:

FIG. 1 is a diagrammatic side elevation of the weighing machine embodying the present invention including the electrical wiring diagram for the control means; and FIG. 2 is a diagrammatic side elevation of a weighing machine embodying a modified form of the present invention wherein for the purposes of clarity the bulk and drip stream feed hoppers are diagrammatically illustrated as separate hoppers and wherein in practice the material feeding means comprises a single hopper having separate bulk and drip feed shutters.

In my United States Patent No. 2,634,080, dated April 7, 1953, for Weighing Machine, there is disclosed a weighing machine embodying a movable weighing element which is arranged to cooperate with an air gauge for pneumatically controlling the material feeding operation. The particular type of air gauge illustrated in said patent finds particular use in connection with the extremely accurate and rapid weighing operations wherein the beam or weighing element is moved an extremely small fraction of an inch, of the order of .001".

In accordance with the present invention a weighing mechanism embodying an electrical control mechanism is provided which cooperates with the movable weighing element to control the material feeding mechanism to discontinue the flow of material forming successive loads to be weighed in response to minute movements of the weighing element caused by the weight of the load being weighed. The electrical control mechanism preferably includes a resilient contact unit comprising in effect a force measuring device operatively connected to the movable weighing element and designed so that a small fractional movement of the weighing element causes a relatively greater movement of the resilient contact unit, said resilient contact unit being preset so that when a preselected deflection force proportional to a predetermined weight of material is reached the resilient contact unit will be actuated to operate the control mechanism to discontinue the feed of the material. In the illustrated embodiment of the invention the resilient contact unit is directly connected to the weighing element eliminating any frictional contact with the weighing element, and the resilient contact unit embodies flat leaf springs which are relatively flexible so as to transmit a negligible amount of vibration from the machine frame whereby extremely accurate weighing operations may be performed.

In one embodiment of the invention, herein illustrated, the present novel electrical control mechanism is shown as applied to a single weight automatic weighing machine provided with a single feed control shutter operated in response to a predetermined deflecting force applied to the weighing element, and in another embodiment of the invention the present control mechanism is shown as applied to a dual weight automatic weighing machine wherein two feed control shutters comprising a bulk stream shutter and a drip stream shutter are individually operated in response to different predetermined deflecting forces applied to the weighing element.

Referring now to the drawings, the present invention for the purposes of illustration has been shown as embodied in a weighing machine wherein the weighing element comprises a cantilever type weighing beam, indicated in general at 10, and includes two pairs of relatively stiff leaf springs 12, 14 secured at one end to a fixed portion of the frame 16 and at their free ends to a rigid member 18 which is provided with a load supporting platform 20 upon which a suitable carton 22 for containing a load may be placed. The weight of the load to be weighed may be partially supported by a coil spring 24 secured to a fixed part of the machine frame 26 and at its other end to an arm 28 projecting laterally from an integral with the member 18 as shown. In order to prevent undue and undesirable oscillations of the scale beam and to damp the same during the weighing operation a dash pot 32 is provided having a piston 34, one end of which moves in oil, the other end being connected to the arm 28 as herein shown. A bolt 36 secured to the machine frame and extended through an opening in the arm 28 is provided with spaced nuts 38, 40 positioned above and below the arm 28 to thereby limit the movement of the arm during the weighing operation.

In operation the weighing beam 10 may be counterbalanced by the spring 24 to weigh loads of any selected predetermined weight by adjusting thumb screw 70 to thereby effect more or less tension upon coil spring 24. In practice in order to effect a very rapid weighing operation the weighing beam is balanced such that minute movement of the weighing beam will be effected when the predetermined weight is reached. For example, if it is desired to form and weigh one-pound (1-lb.) loads, a tension of fourteen ounces is applied to coil spring 24 whereupon the cantilever weighing beam 10 is deflected under the influence of the remaining two ounces of the load and as a result the speed of the weighing operation is substantially increased.

From the description thus far it will be seen that the cantilever weighing beam 10 is arranged to be deflected downwardly through a minute distance proportionate to the weight of the material deposited in the container supported on the beam, and as herein shown, such movement is transferred to a resilient force measuring device indicated generally at 44. The force measuring device 44 includes one flat spring leg 42 directly connected at its lower end to the outer end of the arm 28 and a second flat spring leg 46 connected at its lower end and electrically grounded to a portion of the frame 16. The upper ends of the flat spring legs 42, 46 are connected together, as shown at 48, and provided with a contact member 50 forming part of a switch 52 having a stationary contact 54 supported in an insulating bracket 55 attached to the frame member 16. With this structure it will be seen that in operation when the cantilever beam unit 10 is in its undepressed position, as shown in FIG. 1, the flat spring legs 42, 46 being of equal length will dispose the contact 50 spaced from the stationary contact 54 to maintain the switch open, and when the cantilever beam is deflected downwardly through a relatively minute distance the downward pull on the leg 42 will effect bending of the leg 46 to the right and movement of the contact end through a relatively greater distance. In practice the resilient force measuring device is preferably preset so that a predetermined deflection force applied to the cantilever beam by the weight of the material being deposited in the container 22 will effect movement of the resilient contact unit 44 to close the switch contacts 50, 54 when a predetermined weight is reached. When a different weight is required the counterbalance spring 24 may be correspondingly adjusted so that the predetermined deflection force on the cantilever beam will remain the same to effect movement of the preset resilient force measuring device 44 when when the predetermined weight is reached.

The switch 52 forms part of an electrical relay circuit indicated generally at 68 which includes a solenoid 64 forming a part of the material feeding mechanism indicated generally at 60 having a hopper 61 provided with a shutter 62 adapted to close and terminate the feeding operation when a predetermined weight is reached on the load receiving member 20 of the weighing element 10. For clarity of illustration the detailed mechanical features of the material feeding mechanism 60 have been omitted and may comprise those illustrated and described in my United States Patent No. 2,634,080, dated April 7, 1953, for Weighing Machine. As shown and described in said patent, and as herein shown in FIG. 1, the shutter 62 is connected by linkage 63 to the armature 65 of the electromagnet 64. The shutter is adapted to be urged into a closed position by means of a spring 66. In practice during the feeding cycle of the weighing machine the electromagnet is energized through the electrical relay circuit 68, and the shutter 62 is held in an open feeding position. Thus, it will be observed that the electromagnet 64 is energized to hold the shutter 62 in its open position when the contacts 50 and 54 are open and through the relay circuit 68 the electromagnet 64 is deenergized to release the shutter 62 when the contacts 50, 54 are closed. The details of the electrical circuit may be described as follows: Sources of direct current are supplied, as indicated, at some 400 volts and 100 volts for the electronic tube 200. When contacts 50 and 54 are open it will be seen that the control grid 202 is held near cathode potential by resistor 204 which may be a few megohms. The shield grid 206 is held at plus 100 volts whereby the tube 200 passes sufficient current through the coil 64 to hold the armature 65. As the beam deflects downward and contact is made between 50 and 54 the control grid 202 is suddenly made negative, thereby making tube 200 non-conducting and the solenoid current drops to zero, releasing the armature 65.

Various tubes and voltages may be used as is well known in the art. I prefer to use fairly high voltage, such as 100 v. at the contacts to insure breaking down any surface film resistance. As is well known, the control grid of such tubes requires only the most minute current; hence, no sparking occurs at 50 and 54. It will also be observed that the resilient rocking engagement of the movable contact 50 with the contact 54 permits overtravel of the resilient contact to effect a wiping or rubbing action conducive to keeping the contacts clean.

From the above description it will be seen that a very slight deflection of the cantilever weighing beam 10 as the load reaches is desired weight is substantially amplified by the resilient force measuring device 44 to effect movement of the contact 50 into engagement with the fixed contact 54 and thereby through the relay circuit 68 to deenergize electromagnet 64 when the predetermined weight is reached whereby to cause the feed shutter 62 to be substantially instantaneously closed by the spring 66 to terminate the flow of material into the container disposed upon the weighing beam 10. It will also be observed that the present control mechanism is relatively simple in structure, requires relatively little maintenance and is adapted to respond rapidly to the deflection force of the cantilever beam to effect rapid closing of the feed shutter when the predetermined weight is reached which is conducive to accurate weighing performance. Another advantage of the present force measuring spring contact structure 44 over the air jet type of control illustrated and described in my Patent No. 2,634,080 is that there is no extraneous force acting on the weighing beam during the weighing operation, such as the force of the air blowing on the beam as shown in the patent.

In the embodiment of the invention shown in FIG. 2 the present control mechanism is shown as operatively connected to material feeding mechanism of the type illustrated in my Patent No. 2,634,080, above referred to, for feeding bulk and drip loads to the container supported on the weighing platform 22. As herein shown, the numeral 80 indicates in cross section a divided feed hopper, one view showing a cross section of the hopper which includes the bulk feed shutter 84 and the other view showing a cross section of the same hopper which includes the drip feed shutter 86, each shutter having individual solenoids 106, 112 respectively normally energized to hold both shutters 84, 86 open at the start of the weighing operation.

In the modified form of the invention the cantilever weighing element 10 may be the same as that shown in FIG. 1 and is provided with a similar resilient force measuring device indicated generally at 103 having equal length flat spring legs 100, 104 connected at their lower ends to the frame 102 and bracket 28 respectively, the legs being joined at their upper ends and provided with a contact 98 as shown. The leg 100 is grounded to the frame, and the contact 98 shown in an intermediate position in FIG. 2 forms part of a two-way switch 92 arranged to cooperate with a stationary contact member 96 forming a part of the bulk feed relay circuit indicated generally at 88 and a second stationary contact 94 forming a part of the drip feed relay circuit indicated generally at 90, each stationary contact 96, 94 being insulated from the frame 102.

In operation the cantilever weighing unit is adjusted so that at the start of the weighing operation the resiliently mounted contact 98 is in engagement with the bulk feed contact 96 to close the bulk feed circuit 88 and energize the electromagnet 106 to hold the bulk feed shutter 84 open, the drip feed circuit 90 being arranged to energize its respective solenoid 112 to hold its gate 86 open when the contacts 98, 94 are separated. Thus, at the start of the weighing operation both shutters 84, 86 are open, and when a predetermined bulk or primary weight is deposited into the container 22 the cantilever beam weighing unit 10 is depressed a minute distance proportional to the weight, and the downward deflecting force operating on the leg 104 of the resilient force measuring device 103 will effect a bending movement of the leg 100 a proportionately greater distance to separate the contact 98 from the bulk feed contact 96, and as a result the relay circuit 88 is caused to deenergize solenoid 106 to release its armature 107 whereupon the spring 108 effects closing of the bulk feed shutter 84 as illustrated in FIG. 2. Upon closing of the bulk feed shutter 84 the material continues to flow through the drip feed shutter 86, and when a predetermined final weight is reached the cantilever beam weighing unit is depressed an additional minute distance to effect a correspondingly greater movement of the resilient contact 98 to engage the final weight contact 94 which closes the drip feed relay circuit 90 to cause the solenoid 112 to be deenergized. As a result, its armature 113 is released to permit the spring 110 to close the drip feed shutter 86 to discontinue the material feeding operation.

The bulk feed relay circuit 88, for effecting deenergization of solenoid 106 when the contacts 96, 98 are separated, and the drip feed relay circuit 90, for effecting deenergization of the drip feed solenoid 112 when the contacts 98, 94 are engaged, may be described as follows:

The circuitry indicated generally by 90 for controlling the drip feed is identical with that previously described in connection with FIG. 1. The bulk feed control circuit 88 differs in that the solenoid 106 must be deenergized when contacts 96 and 98 separate. It will be seen that while 96 and 98 are closed, the control grid is near cathode potential by the circuit from point 210, which connects to the cathode, through the contact 98, thence through 96 and resistor 212. When 98 leaves 96 the control grid potential takes a negative value determined by the resistors 212 and 214 and again this tube becomes nonconducting, the solenoid 106 deenergized and the armature 107 is released.

While the preferred embodiment of the invention has been herein illustrated and described, it will be understood that the invention may be embodied in other forms within the scope of the following claims.

Having thus described the invention, what is claimed is:

1. In a weighing machine of the character described having a weighing element adapted to be deflected in an amount proportional to the load being weighed, a resilient force measuring device comprising an electrical contact unit operatively connected to said weighing element including a portion directly connected thereto and movable therewith and having a second portion thereof connected to a stationary support and adapted to absorb any vibration transmitted by the stationary support whereby to prevent premature closing thereof, said resilient force measuring device adapted to yield when a predetermined deflecting pressure corresponding to a predetermined weight is applied to said weighing element, said resilient force measuring device having provision whereby minute movement of the weighing element and said directly connected portion in the order of one-thousandth of an inch operates to effect a substantially greater movement of the intermediate portion of the force measuring device to close said contact, and means responsive to the movement of said force measuring device and closing of the contact for controlling the weighing operation, said force measuring device being preset to provide a measure of the load applied to the weighing element.

2. A weighing machine as defined in claim 1 wherein the force measuring device comprises a pair of leaf springs joined together at their upper ends and directly connected at their lower ends to a stationary support and to the weighing element respectively, downward movement of the weighing element through a minute distance effecting a corresponding downward pull on the connected leg of the force measuring device and causing a rocking movement of the other leg of the same through a greatly increased distance.

3. In a weighing machine, in combination, a weighing element having means for supporting a load to be weighed and adapted to be deflected in an amount proportional to the load, means for feeding a stream of material to be weighed onto the load receiving member of the weighing element, and control means for controlling the operation of said stream feeding means, said control means comprising an electrical circuit including a resilient contact unit operatively connected to said weighing element and forming therewith a force measuring device adapted to yield when a predetermined deflection pressure corresponding to a predetermined weight is applied to said weighing element, said resilient contact unit comprising a pair of leaf spring legs joined together at their upper ends and directly connected at their lower ends to a stationary support and to the weighing element respectively, downward movement of the weighing element through a minute distance effecting a corresponding downward pull on its connected leg and causing a rocking movement of the other leg through a relatively greater distance, and electroresponsive means in said circuit actuated by yielding of said resilient contact unit for terminating the stream feeding operation when said predetermined deflection pressure is reached upon depositing a predetermined weight onto said load receiving member, said force measuring device being preset to provide a measure of the load applied to said load receiving member.

4. A weighing machine as defined in claim 3 wherein the weighing element comprises a cantilever weighing beam including a plurality of vertically spaced and parallel stiff leaf springs, each secured at its inner end to a stationary support, a tie member connecting the outer ends of said leaf springs, and a counterbalancing coil spring cooperating with said stiff leaf springs to yieldingly support a portion of the weight of the load.

5. A weighing machine as defined in claim 3 wherein the weighing element comprises a cantilever weighing beam including a plurality of vertically spaced and parallel stiff leaf springs, each secured at its inner end to a stationary support, a tie member connecting the outer ends of said leaf springs, a counterbalancing coil spring cooperating with said stiff leaf springs to yieldingly support a portion of the weight of the load, said resilient contact unit being preset to be deflected at a predetermined deflection force applied to said cantilever weighing beam, and means for adjusting said counterbalancing spring to permit variations in the weight effective to apply said predetermined deflecting force.

6. In a weighing machine, in combination, a weighing element having means for supporting a load to be weighed and adapted to be deflected in an amount proportional to the load, means for feeding a bulk stream and a drip stream of the material to be weighed onto the load receiving member of the weighing element, and control means for controlling the operation of said bulk and drip stream feeding means, said control means comprising an electrical circuit including a resilient contact unit directly connected to said weighing element and forming therewith a force measuring device adapted to yield when an initial predetermined deflection force corresponding to a predetermined primary weight is applied to said weighing element and adapted to yield a further amount when a second predetermined deflecting force corresponding to a predetermined final weight is applied to said weighing element, said resilient contact unit having provision whereby minute movement of the weighing element operates to effect a substantially greater movement of the contact unit, and electroresponsive means in said circuit responsive to the first yielding movement of the contact unit to terminate the bulk feed, and responsive to the second yielding movement of the contact unit to terminate the drip feed, said force measuring device being preset to provide a measure of the load applied to the weighing element, said weighing element comprising a cantilever weighing beam, and said resilient contact unit comprising a pair of leaf springs joined together at their upper ends and connected at their lower ends to a stationary support and to the weighing element respectively, downward movement of the cantilever weighing beam through a minute distance effecting a corresponding downward pull on its connected leg of the contact unit and causing a rocking movement of the other leg of the contact unit through a greatly increased distance.

(References on following page)

References Cited in the file of this patent

UNITED STATES PATENTS

| | | |
|---|---|---|
| 1,893,205 | Hughes | Jan. 3, 1933 |
| 1,923,745 | Platzer | Aug. 22, 1933 |
| 1,977,394 | McCormick | Oct. 16, 1934 |
| 1,977,395 | McCormick | Oct. 16, 1934 |
| 2,011,931 | Dreyer | Aug. 20, 1935 |
| 2,545,908 | Weckerly | Mar. 20, 1951 |
| 2,597,831 | Willis | May 20, 1952 |
| 2,634,080 | Knobel | Apr. 7, 1953 |
| 2,634,082 | Knobel | Apr. 7, 1953 |
| 2,699,932 | Knobel | Jan. 18, 1955 |
| 2,755,057 | Knobel | July 17, 1956 |